(12) United States Patent
Aoyama et al.

(10) Patent No.: US 8,055,812 B2
(45) Date of Patent: Nov. 8, 2011

(54) DATA TRANSMISSION/RECEPTION SYSTEM

(75) Inventors: Kazunari Aoyama, Yamanashi (JP);
Kunitaka Komaki, Yamanashi (JP);
Yasuharu Aizawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 991 days.

(21) Appl. No.: 11/984,533

(22) Filed: Nov. 19, 2007

(65) Prior Publication Data

US 2008/0123723 A1    May 29, 2008

(30) Foreign Application Priority Data

Nov. 27, 2006   (JP) ................................ 2006-318937

(51) Int. Cl.
*G06F 3/00* (2006.01)
*G06F 15/16* (2006.01)
*H03D 3/24* (2006.01)
*H04J 3/16* (2006.01)
*H04J 3/22* (2006.01)

(52) U.S. Cl. .............. 710/30; 375/220; 709/236; 710/5; 370/470; 370/472

(58) Field of Classification Search .................. 375/220; 710/5, 30; 709/236; 370/470, 472
See application file for complete search history.

(56) References Cited

U.S. PATENT DOCUMENTS

| 5,988,846 | A | 11/1999 | Flamm et al. |
| 5,990,638 | A | 11/1999 | Aoyama et al. |
| 7,009,995 | B1 | 3/2006 | Bohrer et al. |
| 2003/0184250 | A1 | 10/2003 | Kurokawa et al. |

FOREIGN PATENT DOCUMENTS

| DE | 196 26 287 | 2/1997 |
| DE | 198 03 686 | 8/1999 |
| JP | 10-13394 | 1/1998 |
| JP | 2005-151043 | 6/2005 |

OTHER PUBLICATIONS

Extended European Search Report issued in corresponding European Patent Application No. 07119081.3 on Mar. 27, 2008.
Office Action mailed on Oct. 28, 2008 and issued in corresponding Japanese Patent Application No. 2006-318937.

*Primary Examiner* — Alford Kindred
*Assistant Examiner* — Farley Abad
(74) *Attorney, Agent, or Firm* — Staas & Halsey LLP

(57) ABSTRACT

An amplifier (unit) linked via a daisy type serial bus sends a transmission start signal SC and then sends the local data DATAn. If data from an amplifier at the downstream side is not received before transmission of the local data DATAn is completed, the delimit of the data from each amplifier is changed by adding an idle time data TIDD.

5 Claims, 6 Drawing Sheets

TRANSMISSION START TIMING

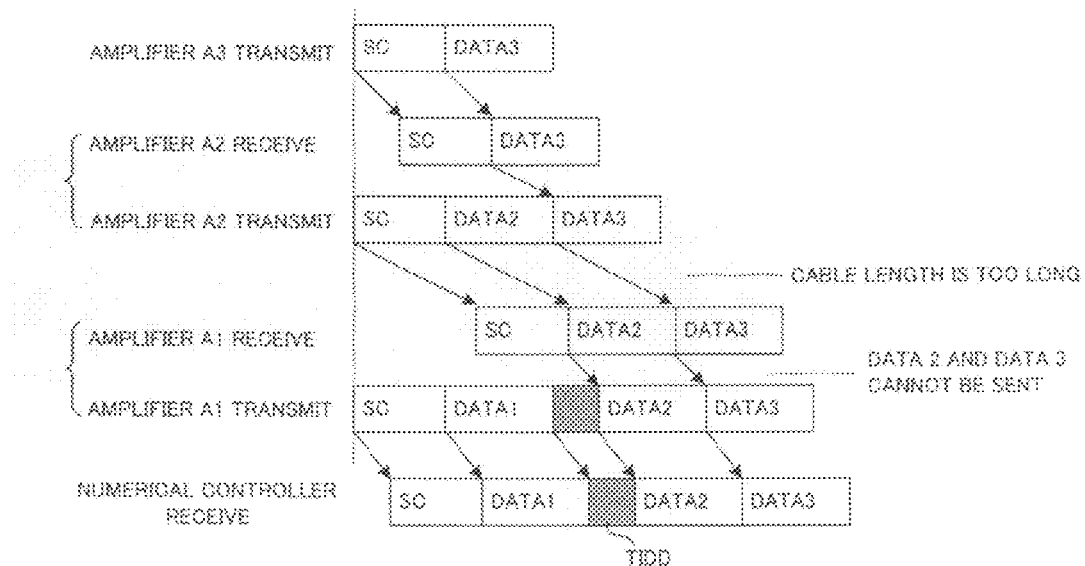
FIG. 9
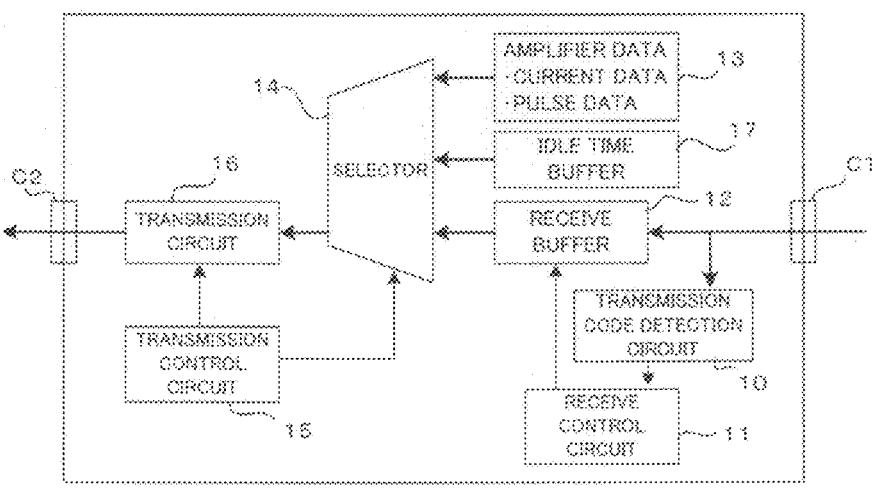
FIG. 10
FIG. 11

FIG. 12
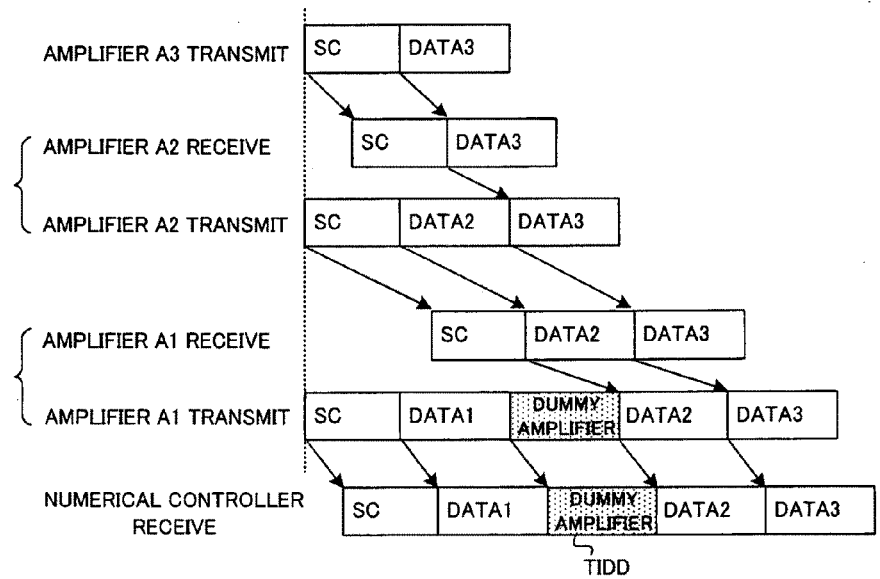
FIG. 13
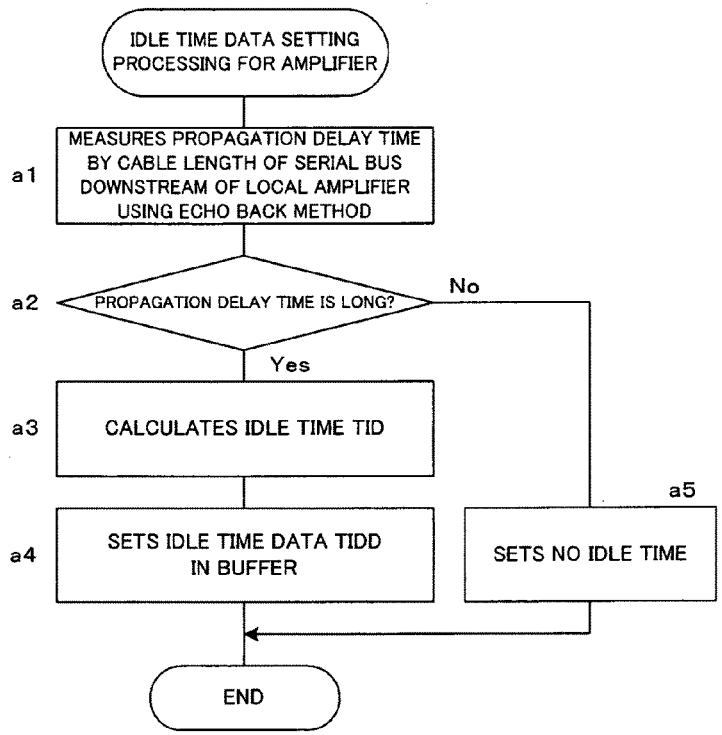
FIG. 14

DATA TRANSMISSION/RECEPTION SYSTEM

BACKGROUND OF THE INVENTION

1. Field of the Invention

The present invention relates to a data transmission/reception between units connected via a serial bus based on a daisy chain method.

2. Description of the Related Art

A data transmission/reception system linking a plurality of units via a daisy chain type serial bus to transmit/receive data among the units is known.

For example, in machine tools controlled by a numerical controller, a system where the numerical controller and a servo amplifier of a servo motor for driving each feed shaft are connected via a serial bus, and the position of a feed shaft and velocity data detected by each servo amplifier are sent to the numerical controller by the daisy chain method, is disclosed in Japanese Patent Application Laid-Open No. 10-13394 (hereafter referred to as Patent Document 1).

FIG. 1 shows an example of a data transmission/reception system of which units (servo amplifiers) are linked by a daisy chain type serial bus, as disclosed in the patent document 1.

The numerical controller 1 and a plurality of (three in this case) servo amplifiers (hereafter just referred to as amplifier) A1, A2 and A3 are connected in a daisy chain method via a serial bus cable 2. Each amplifier A1, A2 and A3 simultaneously sends data of each amplifier, such as the current value of the motor and the position/velocity information fed back from the position/velocity detector installed in the motor, to a unit (an amplifier or numerical controller) at the upstream side following a transmission start code, from a respective second connector C2 to a cable 2 of the serial bus on the side of the numerical controller 1 (or at the upstream side), so as to send the local data to the numerical controller 1. The amplifier data that each amplifier A1, A2 and A3 received from a unit (amplifier) at the downstream side via the first connector C1 is sent to a unit at the upstream side after the local amplifier data, and finally the numerical controller 1 receives data from all the amplifiers A1, A2 and A3 connected via the daisy chain method.

FIG. 2 shows a configuration example of a portion related to the data transmission/reception according to the present invention in the conventional amplifiers A1, A2 and A3. From a first connector C1, which is connected with a servo amplifier at a position most distant (downstream) from the numerical controller 1 via the serial bus cable 2, the amplifier data from the amplifier at the downstream side is received after the transmission start code. When the transmission start code is detected by a transmission code detection circuit 10, a transmission start code receive timing is notified to a receive control circuit 11, the receive control circuit 11 determines the delimit of the data based on a bit position from the transmission start code, and the data from the amplifier at the downstream side is delimited using this delimit of the data, and a receive buffer 12 is instructed to store this data.

From a second connector C2, on the other hand, transmission is started to a servo amplifier or the numerical controller 1 at the upstream side. Transmission is controlled by a transmission control circuit 15, and data to be sent is selected by a selector 14. The selector 14 first selects a transmission start code, then selects the data of an amplifier to be stored in an amplifier data storage section 13, and then selects data of other amplifiers stored in the receive buffer 12. A transmission circuit 16 sends the transmission start code and the amplifier data according to this selection sequence. The transmission start timing is simultaneous for each servo amplifier.

FIG. 3 is a diagram depicting serial data to be sent to the serial bus cable 2, and shows an example of serial data which is sent from an n-th amplifier An, counted from the side closer to the numerical controller 1 (upstream), to the serial bus cable 2. A transmission start code SC, which is a code to indicate the start of transmission, and each amplifier data DATAn, DATAn+1 and DATAn+2, are determined by the bit positions. In the example in FIG. 3, the transmission start code SC is delimited at 60 bits, and the amplifier data is delimited in 70 bit units. The amplifier data is delimited by 70 bits from the bit position next to the receive timing of the transmission start code SC, so that local amplifier data DATAn, and then DATAn+1 and DATAn+2 which were sent from the servo amplifiers at the downstream side, are sent.

When the serial data sent from the servo amplifier at the downstream side is received via the first connector C1, and the transmission code detection circuit 10 detects the reception of the transmission start code SC, the receive control circuit 11 loads the amplifier data, delimited by 70 bits received after the 60-bit transmission start code SC, into the receive buffer 12.

FIG. 4 shows an example of the system shown in FIG. 1, and indicates the serial data which is output from each amplifier A1, A2 and A3 to the upstream side, where after the local amplifier data DATAn is sent, the amplifier data DATAn+1 and DATAn+2, received from the amplifiers at the downstream side of the local amplifier, are sent. The amplifier A3 sends the transmission start code SC and then the local amplifier data DATA3 to be stored in the amplifier data storage section 13 of the amplifier A3. The amplifier A2 sends the transmission start code SC, the local amplifier data DATA2 to be stored in the amplifier data storage section 13, and then the amplifier data DATA3 received from the amplifier A3 at the downstream side, which is stored in the receive buffer 12. The amplifier A1 sends the transmission start code SC, the amplifier data DATA1 to be stored in the amplifier data storage section 13 of the local amplifier A2, and then the amplifier data DATA2 and DATA3 of the amplifiers at the downstream side sent from the amplifiers at the downstream side, which are stored in the receive buffer 12, in this sequence delimited by 70 bits. Each amplifier can smoothly send receive data from downstream to upstream by matching the transmission start timing.

The data transmitted from the amplifier A1 is data to be received by the numerical controller 1, and the numerical controller 1 as well receives the transmission start code SC and the subsequent amplifier data DATA1 to DATA3 from the amplifier at the downstream side, via a connector C1, which is equivalent to the first connector of the amplifier. The numerical controller 1, however, does not have a connector equivalent to the second connector C2 of the amplifiers, since no servo amplifier or numerical controller exists upstream.

FIG. 5 shows a configuration example of a portion related to the receive circuit to receive the serial data in the conventional numerical controller 1. The transmission start code SC, and then the amplifier data DATA1 to DATA3 from the amplifiers at the downstream side are received from the first connector C1. When the transmission start code SC is detected by a transmission code detection circuit 20, the receive timing of the transmission start code is notified to a receive control circuit 21. The receive control circuit 21 determines the delimits of the data based on the bit position from the transmission start code, and instructs a receive buffer 22 to store the result. By delimiting the receive amplifier data, the amplifier data is caused to correspond to the amplifier.

The data stored in the receive buffer 22 is transferred to a memory, which a control processors for respective axes can refer to, via a data transmission circuit 23, so that the axial control processor for controlling the servo motor driven by each amplifier can be used. At this transfer, a parameter setting storage section 24, which stores parameters indicating a relationship of the sequence of the received amplifier data DATA1 to DATA3 (servo amplifiers) and processors for respective axes, is referred to. Based on the relationship of the sequence of the amplifier data DATA1 to DATA3 (servo amplifiers) and processors for respective axes, which is set by parameter, data is sent to the processors. The example of the parameter setting storage section 24 in FIG. 5 shows that the received data DATA1 from the amplifier A1, which was received first, is transferred to the processor P1, the receive data DATA2 from the amplifier A2, which was received second, is transferred to the processor P2, and the receive data DATA3 from the amplifier A3, which was received third, is transferred to the processor P3.

The example in FIG. 4 shows an ideal state where there is no propagation delay due to the cable 2 between each amplifier. But actually a propagation delay due to the cable 2 does exist, so if this delay time due to the cable 2 is considered, the serial data to be transferred among each amplifier A1, A2 and A3, and between the amplifier A1 and the numerical controller 1, are as shown in FIG. 6.

From each amplifier A1 to A3, the serial data is transmitted at the same transmission start timing. The serial data, which is output from the amplifier A3, is received by the amplifier A2 with a propagation delay due to the cable 2 of the serial bus. The amplifier A2 can transmit the local amplifier data DATA2 and the amplifier data DATA3 of the amplifier A3 at the downstream side, as shown in FIG. 6, if reception of the amplifier data DATA3 from the amplifier A3 at the downstream side is started before completing transmission of the local amplifier data DATA2 after transmission of the transmission start code SC. In the same way, the amplifier A1 can transmit the local amplifier data DATA1 and then the amplifier data DATA2 and DATA3 of the amplifiers A2 and A3, if reception of the amplifier data DATA2 and DATA3 from the amplifier A2 at the downstream side is started before completing transmission of the local amplifier data DATA1.

In this way, the numerical controller 1 sequentially receives the amplifier data DATA1, DATA2 and DATA3 after the transmission start code SC, as shown in FIG. 6.

As described above, according to the prior art, the cable length of the serial bus between the numerical controller and an amplifier and between an amplifier and amplifier, that is between units which transmit/receive data to/from each other, is restricted to be short, so that the delay propagation thereof is small, and data can be transmitted/received normally.

If a propagation delay due to the cable 2 of the serial bus is small, the numerical controller can receive amplifier data from each servo amplifier connected by the daisy chain method, as mentioned above.

But if the cable between each amplifier is long, the delay time, until data transmitted by each amplifier is received by an amplifier or the numerical controller at the upstream side, becomes long, and the data receive timing is sequentially shifted behind, with the result that finally an amplifier which transmitted the local amplifier data cannot make it in time to send the amplifier data of the amplifiers at the downstream side.

FIG. 7 shows an example of serial data transmission/reception timing when the cable between amplifier A1 and amplifier A2 is too long to make it in time to send amplifier data DATA2 and DATA3 of the amplifiers A2 and A3 at the downstream side from the second connector C2 of the amplifier A1 at the upstream side to the numerical controller 1.

The amplifier A1 has not started reception of the amplifier data DATA2 and DATA3 from the amplifier A2 at the downstream side even if transmission of the transmission start code SC and the local amplifier data DATA1 has been completed, because the receive timing of the serial data from the amplifier A2 at the downstream side is too slow, and the amplifier data DATA2 and DATA3 have not been input into the receive buffer 12. Therefore the amplifier data DATA2 and DATA3 of the amplifiers A2 and A3 at the downstream side cannot be transmitted.

SUMMARY OF THE INVENTION

The present invention relates to a data transmission/reception system in which a plurality of units are linked from the upstream side to the downstream side via a daisy chain type serial bus, and data signals are transmitted/received among these plurality of units. In this data transmission/reception system, the data signal comprises a transmission start code, and one or more data delimited at a bit position, which is at a predetermined basic number of bits from the transmission start code, a unit at the most upstream side is the first unit, a next unit at the downstream side thereof is a second unit, and a next unit at the downstream side thereof, if one exists, is a third unit, and each unit receives data from all units existing at the downstream side thereof, and units other than the first unit send the local data to the unit at the upstream side at a first delimit after sending the transmission start code to a unit at the upstream side, and if a receive data signal from another unit at the further downstream side of the unit exists, the unit continuously sends, at the next bit position, the data delimited at the bit position out of the received data signal, excluding the transmission start code, and the first unit identifies the data of each unit out of the receive data using the delimit based on the bit position. In this data transmission/reception system, each unit other than the first unit comprises delimiting position change means for changing a bit position of the delimit to send the local data, and the first unit comprises bit position setting storage means for setting and storing a bit position of each delimit, and identifies the data of each unit using the bit position of a delimit which is set by the bit position setting storage means.

The delimiting position change means may use a bit position change unit as a bit length of transmission data.

The delimiting position change means may change a delimiting position by increasing a delimit based on the basic number of bits, and the bit position setting storage means may set a dummy unit corresponding to the increased delimit based on the basic number of bits, so as to identify data of each unit by a bit position of the delimit.

The data transmission/reception system may further comprise measurement means for measuring the propagation delay time due to the line length of a cable connecting one unit and another unit using an echo back method, and the delimiting position change means automatically changes a bit position of the delimit to send a local data based on the propagation delay time measured by the measurement means, and the bit position setting storage means automatically sets and stores the changed bit position.

The first unit may be a numerical controller, and the second unit and the third unit (if they exist) may be servo amplifiers for driving a servo motor of each axis controlled by the numerical controller.

Since the present invention has the above configuration, a data transmission/reception system, which is not restricted by the length of the cable between units connected via a daisy chain type serial bus and can send/receive data without any problems even if the cable is long, can be provided.

According to the present invention, data can normally be sent/received even if the propagation delay of data due to the cable length is large, so the cable between units can be freely increased, and a system where data is transmitted/received among units connected via a daisy chain type serial bus can be easily constructed.

BRIEF DESCRIPTION OF THE DRAWINGS

The above mentioned and other objects and characteristics of the present invention will be clarified by the following embodiments, which will be described with reference to the accompanying drawings.
In these drawings:

FIG. 9 is a diagram for explaining that serial data can be transmitted/received normally in the data transmission/reception system according to an embodiment of the present invention even if a propagation delay due to cable is large;

FIG. 10 is a diagram depicting a configuration example of a portion related to data transmission/reception in a servo amplifier constituting the data transmission/reception system according to an embodiment of the present invention;

FIG. 11 is a table showing the settings of the relationship of the sequence of amplifier data to be received and processors for respective axes, and the setting of idle time data, which are set in the numerical controller constituting the data transmission/reception system according to an embodiment of the present invention;

FIG. 12 is a diagram depicting a data transmission/reception system according to another embodiment of the present invention;

FIG. 13 is a table showing the settings of the relationship of the sequence of amplifier data to be received and processors for respective axes, and the setting of idle time data, which are set in the numerical controller constituting the data transmission/reception system shown in FIG. 12;

FIG. 14 is a flow chart depicting the algorithm of idle time measurement/setting processing.

DETAILED DESCRIPTION OF THE PREFERRED EMBODIMENTS

As an embodiment of the data transmission/reception system in which a plurality of units are linked via a daisy chain type serial bus and data signals are transmitted/received among these plurality of units, a system comprised of a numerical controller 1 and a plurality of (three in this case) servo amplifiers A1 to A3, shown in FIG. 1, will be described. In the system shown in FIG. 1, the numerical controller 1 and servo amplifiers A1 to A3 are connected via a daisy chain type real bus cable 2, where data is transmitted/received.

Figure 1:
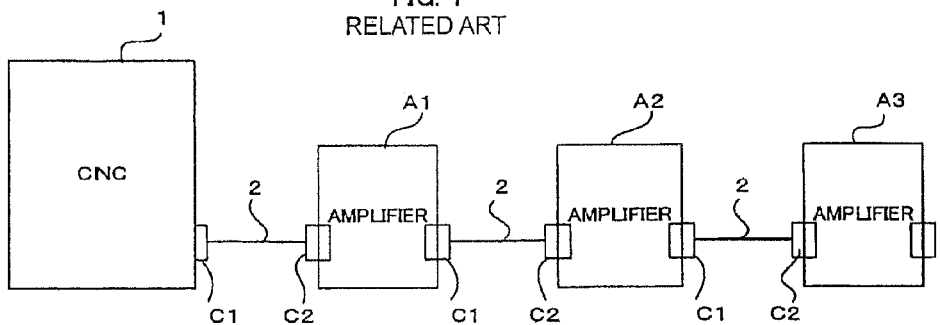
FIG. 1 is a diagram depicting an example of the configuration of a system where data is transmitted/received among a numerical controller and a plurality of servo amplifiers connected via a daisy chain type serial bus.
Figure 2:
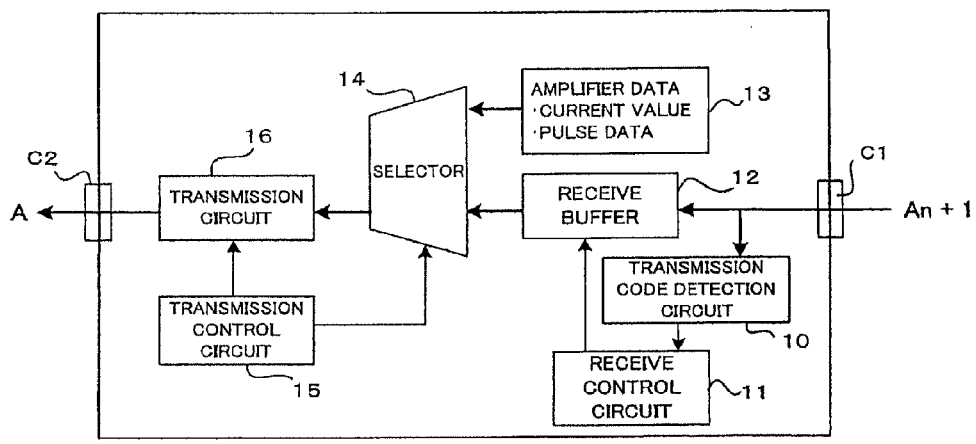
FIG. 2 is a diagram depicting a configuration example of a portion related to conventional data transmission/reception in a servo amplifier constituting the system shown in FIG. 1.
Figure 3:
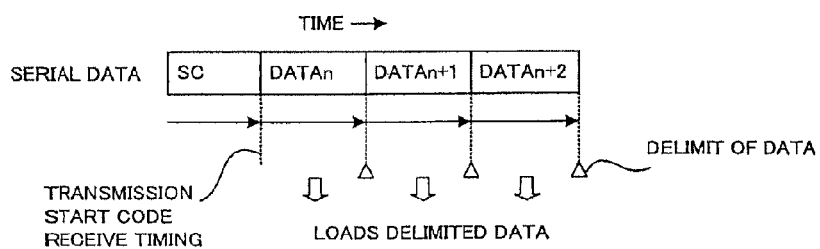
FIG. 3 is a diagram depicting a serial data to be transmitted to a serial bus.
Figure 4:
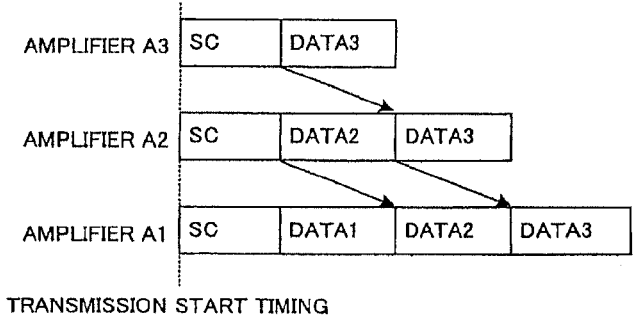
FIG. 4 is a diagram depicting a serial data to be output from an amplifier at the downstream side to an amplifier at the upstream side in the system configuration example shown in FIG. 1.

Whether or not an amplifier at the downstream side transmits amplifier data, and a unit at the upstream side (amplifier or numerical controller) receives this data and transmits the receive data without problems depends not only on the length of the cable 2, but also on the time required for circuit processing until the data received by the first connector C1 is transmitted by the second connector C2 shown in FIG. 1 and FIG. 2.

A reception not in time for transmission indicates that a propagation delay occurred due to the cable, for example, and in the case of a high-speed data transfer, the line length is restricted because of this delay. Each unit stores the data received from a unit at the downstream side in a receive buffer 12 of the local unit once, then transmits it to the unit at the upstream side, but the time required from reception to transmission also restricts the line length.

Here, if

Ln: the line length (meter) of a cable (serial bus) between an amplifier n and an amplifier n+1 at the downstream side which is connected to the amplifier n.

Tdata-n: The time (second) from the amplifier n+1 starting the transmission of data of the amplifier n+1 to the amplifier n to the amplifier n starting transmission of the data of the amplifier n+1 to the upstream side. The transmission timings among the amplifiers are synchronized, so Tdata-n is the same as the transmission time of DATAn.

Trts: The circuit processing time (second) from receiving the data from an amplifier at the downstream side to transmitting it to an amplifier at the upstream side.

Figure 8:
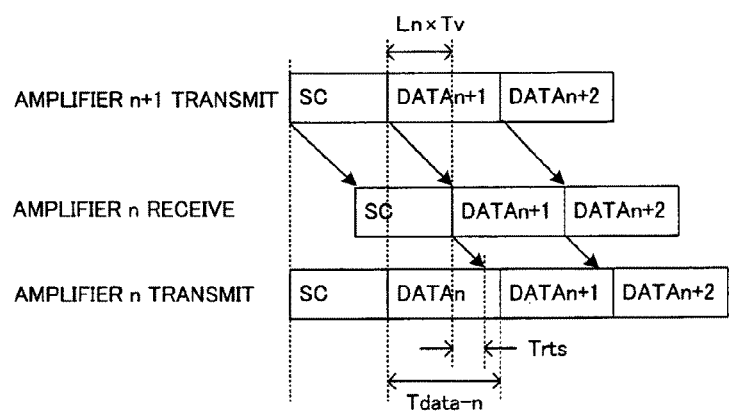
FIG. 8 is a diagram for explaining the judgment on whether the serial data from an amplifier is transmitted/received normally.

Tv: The time (second) required for a signal to pass through a cable of which the line length is 1 meter, then whether reception and transmission of data can be implemented without any problems depends on whether the following expression (1) is established as shown in FIG. 8.

$$Ln \times Tv < (Tdata\text{-}n - Trts) \tag{1}$$

If Expression (1) is not established and line length Ln is long, an idle time (added time) TID is added, and the idle data time data TIDD having the number of bits corresponding to this idle time TID is added to the serial data to be transmitted, and the bit position at the delimit of the data is changed so that the data can be received and transmitted normally. In other words, the idle time TID is added so that the following Expression (2) is established, and the bit position of the delimit of the data is changed.

$$Ln \times Tv < (Tdata\text{-}n - Trts + TID) \tag{2}$$

The above mentioned time Tdata-n and the time Trts are values which are determined once the configuration of the amplifiers is determined and become known when the circuit configuration is designed. The time Tv required for a signal to pass through the cable with cable length Ln, or line length 1 meter, can also be determined by actual measurement, and by calculating these values in advance, the idle time TID, which satisfies Expression (2), can be determined and set. Also the propagation delay time (Ln×Tv) can be determined using the measurement method based on echo back disclosed in the above mentioned Patent Document 1, and using the propagation delay time (Ln×Tv) determined like this, the idle time TID that satisfies Expression (2) can be determined automatically, and the idle time data TIDD can be set automatically.

In other words, as disclosed in Patent Document 1, an amplifier (original amplifier) sends a signal for delay measurement to an amplifier at the downstream side, the amplifier at the downstream side receives this signal for delay measurement, and returns a signal for reply to the original amplifier, and the original amplifier receives this signal and measures the time from sending the signal for delay measurement to receiving this signal for reply. Based on this measured time, the propagation delay time (Ln×Tv) can be obtained and the idle time TID can be determined, and an idle time data TIDD can be set automatically based on the propagation delay time (Ln×Tv) thus obtained.

FIG. 9 shows an example according to the present embodiment, where the line length between the amplifier A2 and the amplifier A1 is long, and the data arrival time in the amplifier A1 delays, and the data arrival does not make it for transmission from the amplifier A1 to the numerical controller in this state, so the amplifier A1 inserts idle time TID1 after delimiting with the basic number of bits to transmit the amplifier data DATA1, and sends the amplifier data DATA2 after the idle time data TIDD1. In other words, in the serial data subsequent to the transmission start code, which is sent from the amplifier A1 to the numerical controller 1, a bit position at the delimit of the data, where the amplifier data DATA2 or later data starts to be sent, is changed so that the idle time data TIDD1 is sent until the amplifier data DATA2 starts to be stored in the receive buffer 12, then the amplifier data DATA2 and DATA3 are sent.

For this idle time data TIDD1, an idle time TID with which Expression (2) is established, is determined, and is converted into a number of bits and set, and a detailed value such as an analog value may be set, but if an integral multiple of a bit length of ordinary data is used, the circuit becomes simple since detailed values need not be set in the amplifiers and the numerical controller.

FIG. 10 is a diagram depicting a portion related to the transmission/reception of data in the amplifiers A1 to A3 according to the present embodiment. A difference from the prior art shown in FIG. 2 is that an idle time buffer 17 is disposed, and a selector 14 selects in the sequence of an amplifier data storage section 13, idle time buffer 17 and receive buffer 12.

If the propagation delay time (Ln×Tv), due to the cable length Ln from an amplifier to a next amplifier at the downstream side, satisfies Expression (1), the idle time data is not set (or 0 is set) in the idle time buffer 17, and if Expression (1) is not satisfied, an idle time TID that satisfies Expression (2) is determined, and the idle time TID thus determined is converted into a number of bits and is determined using the data bit length unit, and is set in the idle time buffer 17 as the idle time data TIDD.

Figure 5:
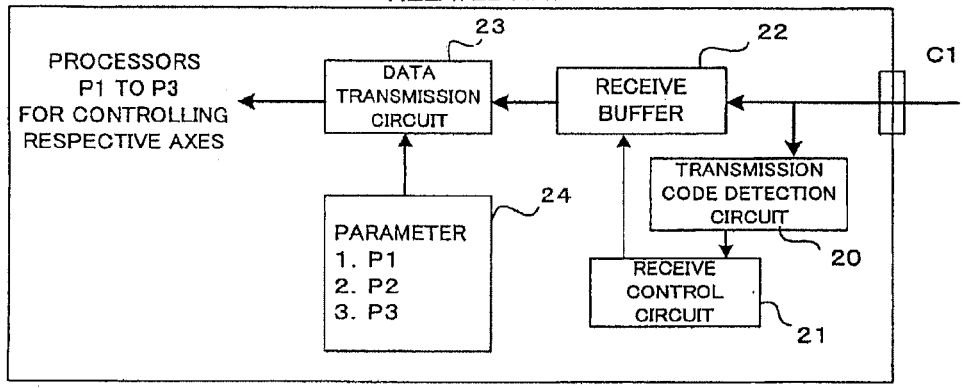
FIG. 5 is a diagram depicting a configuration example of a portion related to a receive circuit which receives a serial data in the numerical controller constituting the system shown in FIG. 1.
Figure 6:
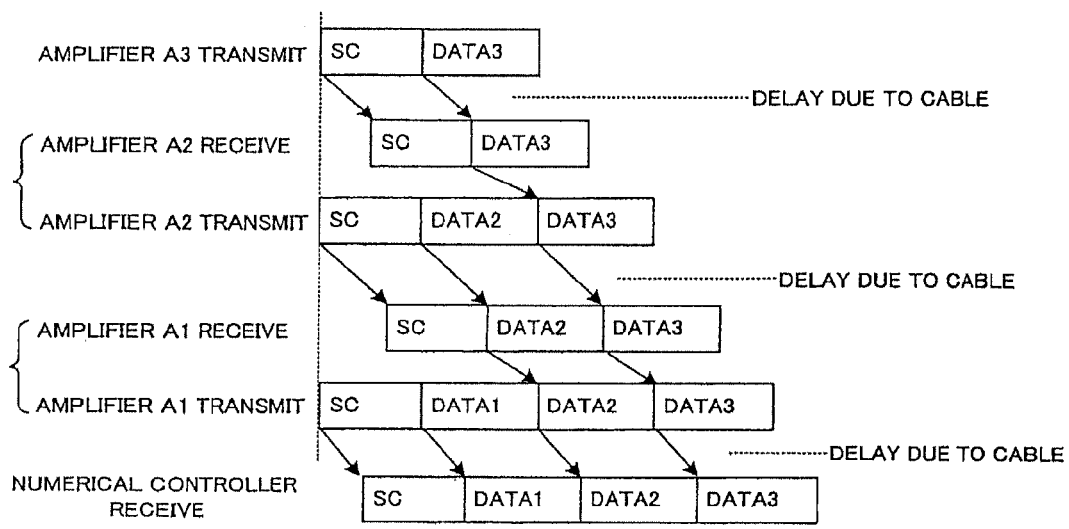
FIG. 6 is a diagram depicting a serial data to be output from an amplifier at the downstream side to an amplifier at the upstream side in the system configuration shown in FIG. 1 when a propagation delay due to the cable is considered.
Figure 7:
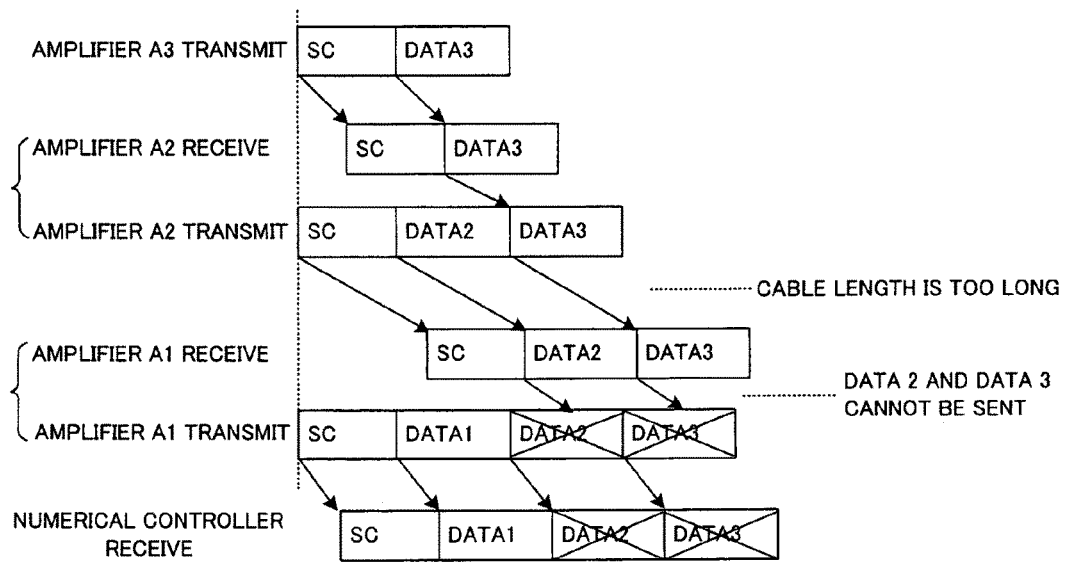
FIG. 7 is a diagram for explaining that serial data cannot be transmitted/received normally in a conventional data transmission/reception system having the system configuration example shown in FIG. 1 if a propagation delay due to cable is large.

The configuration of the portion related to the receive circuit for receiving the serial data in the numerical controller 1 is the same as the prior art shown in FIG. 5, but the content of the relationship of the sequence of the amplifier data DATA1 to DATA3 to be received (servo amplifiers) and processors for respective axes, which is set in the parameter setting storage section 24, is different. In the receive data, a bit position at delimit of the amplifier data becomes different from the delimit position based on the basic number of bits since idle time is set, so a delimit position is also set.

Now an example in which the cable length between the amplifier A1 and the amplifier A2 is long and Expression (1) is not satisfied and the number of bits of idle time is set in the idle time buffer 17 of the amplifier A1, as shown in FIG. 9, will be described.

In this case, the idle time data TIDD1 for the amplifier data DATA1 to be received first is set in the parameter setting storage section 24 of the numerical controller 1, as shown in FIG. 11, and an added idle time (data on added idle time) exists between the amplifier data DATA1 to be received first and the amplifier data DATA2 to be received next, and the data delimiting positions are changed accordingly. The bit position, where the amplifier data DATA2 is stored, is behind the position at the basic number of bits (70 bits), where the amplifier data DATA1 is stored, by the amount of idle time data TIDD1.

Each amplifier A1 to A3 sends the transmission start code SC at the same transmission start timing, as shown in FIG. 9, then the selector 14 selects the amplifier data storage section 13, idle time buffer 17 and receive buffer 12 sequentially, and sends the local amplifier data DATA (e.g. current value, position detected by a pulse coder, velocity data) stored in the amplifier data storage section 13, the idle time data TIDD (if it is set in the idle time buffer 17), and then the data on the other servo amplifiers stored in the receive buffer 12, to the amplifier at the upstream side or the numerical controller 1 via the transmission circuit 16, second connector C2 and serial bus cable 2.

In the case of the example shown in FIG. 9, any amplifier is not connected to the downstream side of the amplifier A3, so the amplifier A3 sends the transmission start code SC and then the local amplifier data DATA3 to be stored in the amplifier data storage section 13. The amplifier A2 sends the transmission start code SC and then the local amplifier data DATA2 to be stored in the amplifier data storage section 13, then sends the amplifier data DATA3 of the amplifier A3 stored in the receive buffer 12 because the idle time data TIDD is not set in the idle time buffer 17, or because the set value is 0.

The amplifier A1 sends the transmission start code SC and then sends the local amplifier data DATA1 stored in the amplifier data storage section 13, then sends the idle time data TIDD1 which is set in the idle time buffer 17, and then sends the amplifier data DATA2 and DATA3 of the amplifiers A2 and A3 stored in the receive buffer 12.

As a result, the numerical controller 1 receives the transmission start code SC, amplifier data DATA1 of the amplifier A1, idle time data TIDD1, and the amplifier data DATA2 and DATA3 of the amplifiers A2 and A3 in this sequence, and the amplifier data DATA1, idle time data TIDD1, amplifier data DATA2 and amplifier data DATA3 are stored in the receive buffer 22 of the numerical controller 1 in this sequence.

A processor of the numerical controller 1 transfers the amplifier data DATA, which is set in the processor for controlling each axis, based on the relationship of the sequence of the amplifier data DATA1 to DATA3 to be received (servo amplifiers) and processors for respective axes, which is set in the parameter setting storage section 24. In this example, the parameters are set as shown in FIG. 11, so the amplifier data DATA1, which is set in the first to $70^{th}$ bit positions of the receive buffer 22, is transferred to the processor P1 for controlling the first axis, of which processor number is set as "1". Since the idle time data TIDD1 is stored next to this amplifier data DATA1, the bit position is shifted by an amount corresponding to the idle time data TIDD1, and the amplifier data DATA2 of the amplifier A2, starting with this bit position, is transferred to the processor P2 to be set for the second axis. Then the amplifier data DATA3 of the amplifier A3, which is stored 70 bits later, is transferred to the processor P3 to be set for the third axis.

In other words, the amplifier data DATA1, from the first to $70^{th}$ bit positions stored in the receive buffer 22, is transferred to the processor P1 for controlling the first axis, the amplifier data DATA2, from a bit position after the amount of the idle time data TIDD1 to the $70^{th}$ bit position, is transferred to the processor P2 for controlling the second axis, then the amplifier data DATA3, from there to the $70^{th}$ bit position, is transferred to the processor P3 for controlling the third axis.

In the above embodiment, if the length of the idle time data TIDD is set to be an integral multiple of the basic number of bits (70 bits) to delimit ordinary amplifier data DATA, this embodiment is equivalent to adding a dummy amplifier in the actual serial servo bus system. In the above example, it can be assumed that one dummy amplifier is inserted between the amplifiers A2 and A1 of which cable length is long, so that a 70 bit idle time data TIDD is set in the idle time buffer 17 of the amplifier A1, and the relationship between each amplifier and processor in the parameter setting storage section 24 in the numerical controller 1 can be set as if a dummy amplifier exists.

FIG. 12 shows the relationship of data transmission/reception in each amplifier A1 to A3, and the numerical controller 1 in such a case.

FIG. 13 shows an example of setting the relationship of the sequence (servo amplifiers) of the amplifier data DATA to be received and processors for respective axes, which is set in the parameter setting storage section 24 of the numerical controller 1, in this case. The first amplifier data DATA1, from the first to the $70^{th}$ bit positions of the receive buffer 22, is for the processor P1 for controlling the first axis, the data up to the next $70^{th}$ bit position is an idle time data TIDD1 of the dummy amplifier, for which a processor is not specified. The amplifier data DATA2 up to the next $70^{th}$ bit is specified for the processor P2 for the second axis, the amplifier data DATA3 up to the next $70^{th}$ bit is specified for the processor P3 for the third axis, and each amplifier data is transferred to the specified processor respectively.

For determining whether or not the idle time TID should be inserted in each servo amplifier A1 to A3, measurement of a propagation delay time due to cable length is carried out using an echo back method, as disclosed in Patent Document 1. Judging whether the measured propagation delay time (Ln× Tv) satisfies Expression (1) or not, if Expression (1) is not satisfied because the line length Ln is too long, the idle time TID is calculated automatically, and the idle time data TIDD corresponding to this idle time TID is set automatically. In other words, a minimum idle time TID that satisfies the following Expression (3), which is determined by Expression (2) using the measured propagation delay time (Ln×Tv) and a known time Tdata-n and Trts, is determined. In this case, the idle time TID may be determined by the bit length unit, or is determined in the unit of an integral multiple of the basic number of bits (70 bits) for delimiting the amplifier data DATA, and the idle time data TIDD is set.

$$Ln \times Tv - Tdata\text{-}n + Trts < TID \qquad (3)$$

FIG. 14 is a flow chart depicting the algorithm of the idle time measurement/setting processing, which is executed by a processor of each servo amplifier.

If an idle time measurement/setting command is output, just like the delay time measurement command disclosed in Patent Document 1, from the numerical controller 1 via a communication circuit, which is not illustrated, each servo amplifier starts processing shown in FIG. 14. In other words, just like the delay time measurement processing disclosed in Patent Document 1, the time required for transmitting the delay time measurement command to an amplifier at the downstream side until receiving a reply signal indicating reception of this delay time measurement command from the amplifier at the downstream side is measured, and the propagation delay time (Ln×Tv), due to the cable length Ln, is determined by this time (step a1).

Based on the determined propagation delay time (Ln×Tv) and a known time (Tdata-n−Trts), it is judged whether Expression (1), that is "Ln×Tv<(Tdata-n−Trts)" is satisfied or not (step a2). If Expression (1) is not satisfied and propagation delay time (Ln×Tv) is long, the idle time TID is calculated by Expression (3) (step a3), the idle time data TIDD is determined, and this data is set in the idle time buffer 17 (step a4).

If Expression (1) is satisfied and the propagation delay time is not long in the judgment in step a2, no idle time is set; that is, nothing is set or "0" is set in the idle time buffer 17 (step a5).

Figure 15:
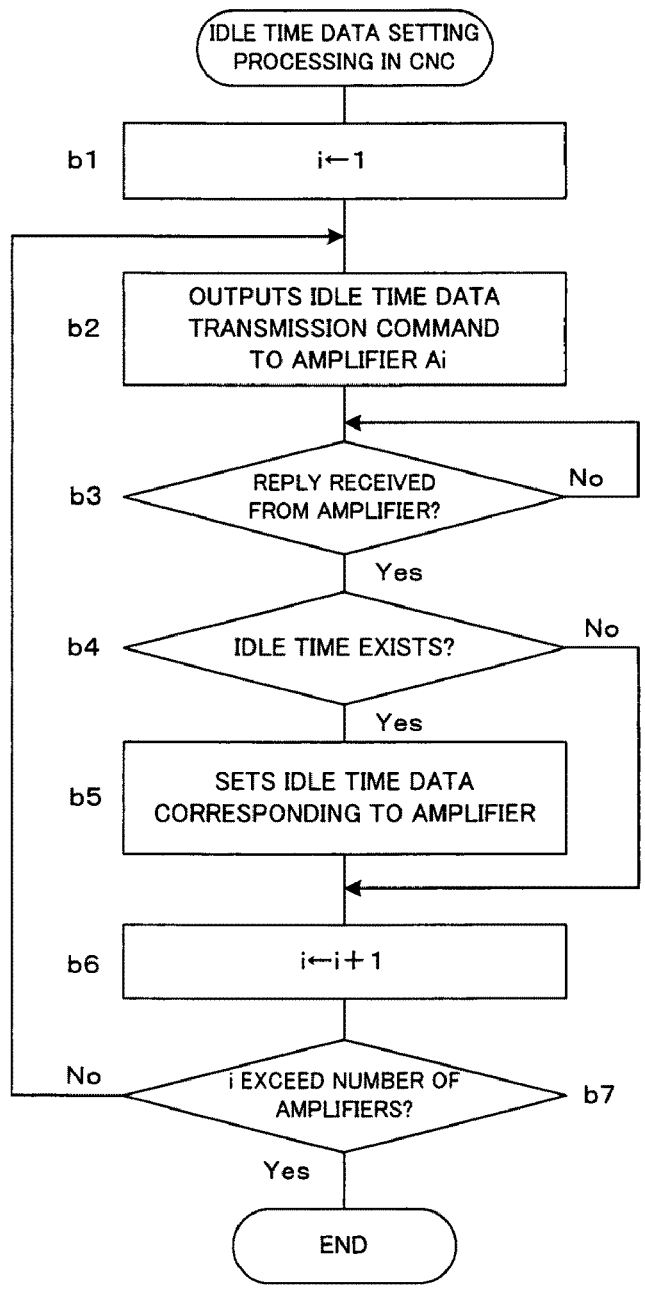
FIG. 15 is a flow chart depicting an algorithm of the processing to enter and set idle time data in the parameter setting storage section of the numerical controller where the relationship of the sequence of amplifier data to be received and processors for respective axes is set.

FIG. 15 is a flow chart depicting the algorithm of processing to insert and set the idle time data in the parameter setting storage section 24, where the relationship of the sequence of the amplifier data DATA to be received (servo amplifiers) and processors for respective axes is set in the numerical controller 1.

The processor of the numerical controller 1 outputs the delay time measurement command to each amplifier and has each amplifier set the idle time data TIDD, then starts the processing shown in FIG. 15. First, the index i, to specify an amplifier, is set to "1" (step b1), and outputs the idle time data transmission command to the amplifier Ai (step b2). The amplifiers are called A1, A2, . . . in the sequence from the side closer to the numerical controller, and index i indicates the sequential number of the amplifier from the one closer to the numerical controller, and also indicates the receive sequence of the amplifier data DATA.

When the idle time data transmission command is received from the numerical controller 1, the amplifier Ai transmits the idle time data TIDDi, which is set in the idle time buffer 17.

The numerical controller 1 waits until a reply is received from the amplifier Ai (step b3), and if a reply is received, the numerical controller 1 judges whether the idle time data TIDDi exists or not (step b4), and if the idle time data TIDDi exists, the numerical controller 1 sets and stores this transmitted idle time data TIDDi in association with the amplifier data of the amplifier stored in the parameter setting storage section 24 (step b5). In the case of the example in FIG. 11, the idle time data TIDD1 is transmitted from the amplifier A1 which is closest to the numerical controller, and this is set and stored in association with the amplifier data DATA1 of the amplifier A1.

If the idle time data TIDD is to be set in the idle time buffer 17 as an integral multiple of the basic number of bits (70 bits) to delimit the amplifier data DATA, as shown in FIG. 12, then the idle time data TIDD is delimited by the length of the amplifier data DATA (70 bits), and set as a dummy amplifier after the amplifier from which this idle time data TIDD is transmitted, or after the amplifier data of this amplifier, as shown in FIG. 13.

Then the index i is incremented by "1" (step b6), and judges whether or not the value of this index i exceeded the number of amplifiers connected via the daisy chain method (step b7), and if not exceeded, processing returns to step b2. If it is judged that the idle time data TIDDi does not exist in step b4, then the setting processing in step b5 is not performed, and processing proceeds from step b4 to step b6.

Hereafter proceeding in step b2 to step b7 are repeatedly executed until the index i exceeds the number of amplifiers, and the idle time data TIDD is inserted and set in the parameter setting storage section 24, where the relationship of the sequence of the amplifier data DATA to be received (servo amplifiers) and processors for respective axes is set.

In the above embodiments, an example of a data transmission/reception system, where the numerical controller and a plurality of servo amplifiers are connected via a daisy chain type serial bus cables, was shown, but the present invention can also be applied to a data transmission/reception system among various units, such as controllers, instead of a numerical controller and servo amplifiers, connected via daisy chain type serial bus cables.

What is claimed is:

1. A data transmission/reception system in which a plurality of units are linked from an upstream side to a downstream side via a daisy chain type serial bus, and data signals are transmitted/received among said plurality of units, wherein
    said data signal comprises a transmission start code, and one or more data delimited at a bit position, which is at a predetermined basic number of bits from said transmission start code,
    a unit at most upstream side is a first unit, a next unit at the downstream side thereof is a second unit, and a next unit at the downstream side thereof, if one exists, is a third unit, and each unit receives data from all the units existing downstream thereof,
    each unit other than said first unit sends local data to the unit at the upstream side at a first delimit after sending the transmission start code to the unit at the upstream side, and if a received data signal from another unit further downstream exists, continuously sends, at a next bit position, data delimited at the next bit position from said received data signal, excluding the transmission start code, and
    said first unit identifies data of each unit from the received data, using the delimit based on the bit position, and wherein
    each unit other than said first unit comprises delimiting position change means for changing a bit position of the delimit to send the local data according to propagation delay time due to a line length of a cable connecting itself and another unit from which data is received and adding an idle time, and
    said first unit comprises bit position setting storage means for setting and storing a bit position of each delimit, and identifies data of each unit using the bit position of the delimit which is set by said bit position setting storage means.

2. The data transmission/reception system according to claim 1, wherein said delimiting position change means uses a bit position change unit as a bit length of transmission data.

3. The data transmission/reception system according to claim 1, wherein said delimiting position change means changes a delimiting position by increasing a delimit based on the basic number of bits, and said bit position setting storage means sets a dummy unit corresponding to the increased delimit based on the basic number of bits so as to identify data of each unit by a bit position of the delimit.

4. The data transmission/reception system according to claim 1, further comprising measurement means for measuring propagation delay time due to the line length of a cable connecting one unit and another unit using an echo back method, and said delimiting position change means automatically changes a bit position of the delimit to send the local data based on the propagation delay time measured by said measurement means, and said bit position setting storage means automatically sets and stores said changed bit position.

5. The data transmission/reception system according to claim 1, wherein said first unit is a numerical controller, and said second unit and third unit are servo amplifiers for driving a servo motor of each axis controlled by said numerical controller.

* * * * *